455-609 AU 233 EX
FIP8106 OR 3,218,390

CROSS REFERENCE EXAMINER
230

Nov. 16, 1965 J. BRAMLEY 3,218,390

OPTICAL SYSTEM FOR THE UTILIZATION OF COHERENT LIGHT

Filed Dec. 27, 1961 3 Sheets-Sheet 1

1. Plural channel Transmission

Spatial (patch) modulation

2. Cassegrainian System

3. Airy Disk, Fig. 11

4. Image Orthicon spatial detection, Col. 13

INVENTOR
Jenny Bramley
BY
[signature]
ATTORNEYS

Nov. 16, 1965 J. BRAMLEY 3,218,390
OPTICAL SYSTEM FOR THE UTILIZATION OF COHERENT LIGHT
Filed Dec. 27, 1961 3 Sheets-Sheet 2
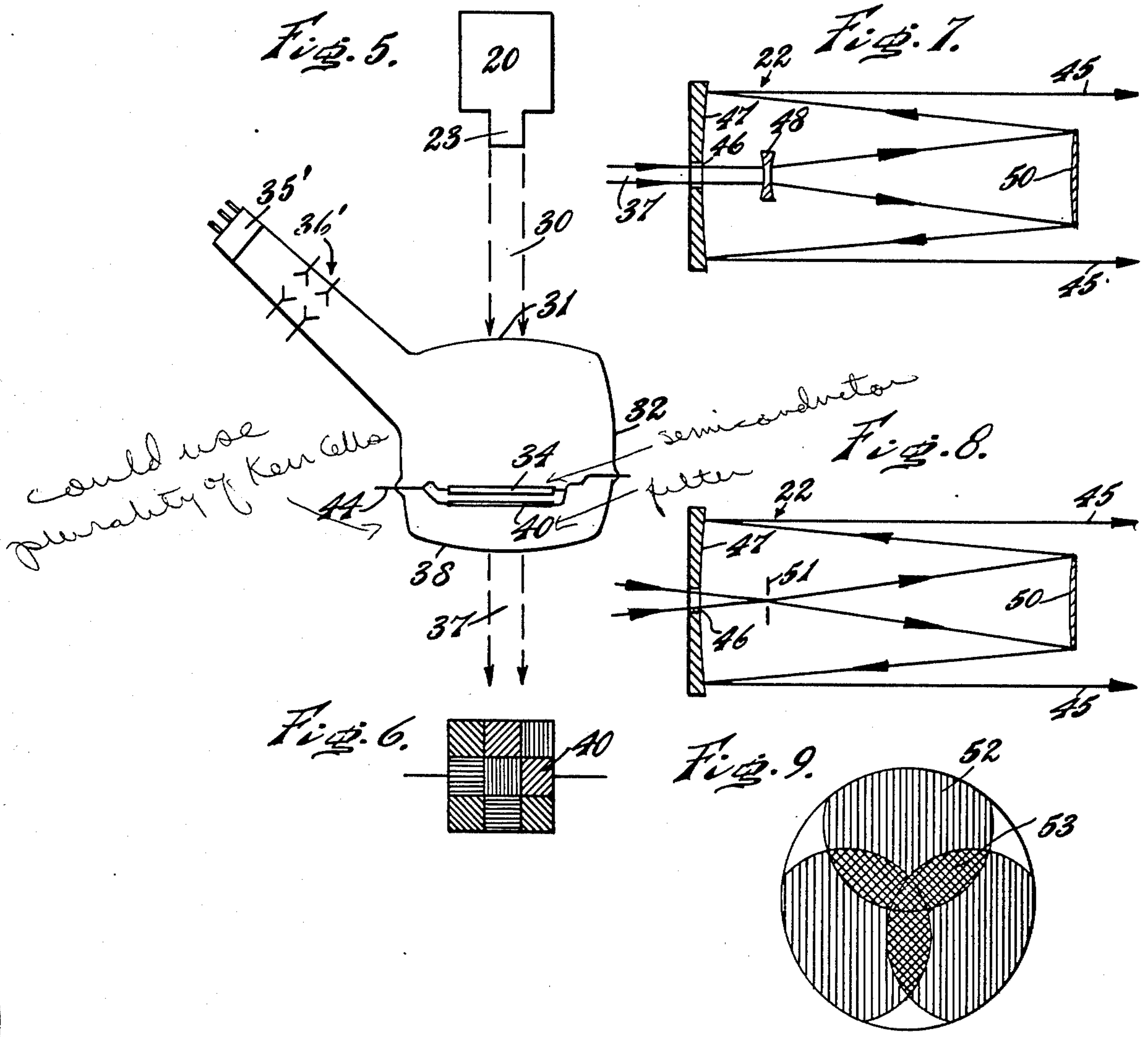
Fig. 5. Fig. 6. Fig. 7. Fig. 8. Fig. 9.
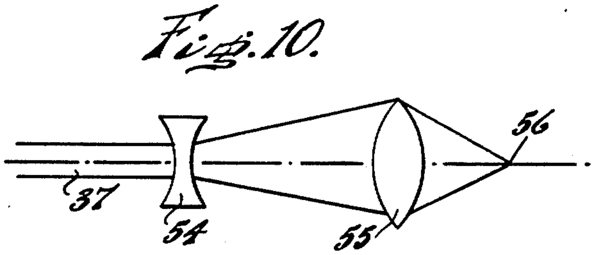
INVENTOR
Jenny Bramley
BY
ATTORNEYS

OPTICAL SYSTEM FOR THE UTILIZATION OF COHERENT LIGHT

Filed Dec. 27, 1961 3 Sheets-Sheet 3

INVENTOR
Jenny Bramley
BY
ATTORNEYS

United States Patent Office 3,218,390

Patented Nov. 16, 1965

3,218,390

OPTICAL SYSTEM FOR THE UTILIZATION OF COHERENT LIGHT

Jenny Bramley, Passaic, N.J.
(7124 Strathmore St., Falls Church, Va.)

Filed Dec. 27, 1961, Ser. No. 162,489
8 Claims. (Cl. 178—7.85)

This application has been divided and subject matter relating to apparatus and/or method for utilizing apparatus in the nature of a purely optical system is embodied in my copending application Ser. No. 244,194, filed Dec. 12, 1962, for Optical System for the Utilization of Coherent Light.

The present invention relates to a system for presenting and conveying information of any written nature, including alpha-numerical material, pictorial material, and the like.

A purpose of this invention is to provide a relatively simple and inexpensive means for constructing, from information presented to the system in the form of electrical signals, a visual display of the information in the form of written characters.

A further purpose is to present the information on a record, which is equivalent to that on a printed page.

A further purpose is to provide a set of modulated light pulses from the information presented to the system in the form of electrical signals.

A further purpose is to devise a system for imparting visual information to a light beam, which information can be read in a very short interval of time after the input information has been impressed on the light beam.

A further purpose is to optimize the design of a light valve for imparting information to the light beam.

A further purpose is to optimize the design of a light valve for imparting to a light beam information in the form of a time-sequentially modulated chromatic pattern.

A further purpose is to utilize a light valve for imparting information to the light beam in the form of a spatial pattern, each element of the pattern being capable of being modulated time-sequentially.

A further purpose is to provide a number of sets of time-sequentially modulated light pulses, each set of discrete wavelength, from the information presented to the system by the electrical signals on a number of electrical channels in parallel.

A further purpose is to utilize an optical system designed to retain a coherent wavefront in simple geometrical form within a deviation of one wavelength per centimeter.

A further purpose is to optimize the design of an optical system which will enlarge the cross section of a coherent light beam incident upon it, the light beam having a time-sequentially modulated pattern impressed on it, while maintaining the coherence of the beam, so that each of the elements of the time-sequentially modulated pattern retains its identity at the receiver.

A further purpose is to utilize an optical system which will transmit a light beam incident upon it in the form of a number of discrete nearly parallel light bundles, acting as channels in parallel, while retaining the individuality of these discrete light bundles in the transmitted beam.

A further purpose is to optimize the design of a reflective optical system which will enlarge the cross section of the beam incident upon it while keeping the wavefront coherent and nearly plane and while at the same time minimizing the aberrations.

A further purpose is to design a refractive optical system which optimizes the transformation of the coherent wavefront in the incident radiation into an emergent coherent wavefront while minimizing the aberrations.

In the drawings I have chosen to illustrate a few only of the numerous embodiments in which my invention may appear, selecting the forms shown from the standpoints of convenience in illustration, satisfactory operation and clear demonstration of the principles involved. These figures are not drawn to scale.

FIGURE 9 is a diagrammatic front elevation showing the enlarged coherent light beam with the retention of resolution.

FIGURE 10 is a diagrammatic axial section of a short focus optical system according to the invention.

In order to utilize fully the properties of the optical maser for communication purposes, it is desirable, as stated previously, to take advantage of the coherent properties of the radiation. A number of ways are possible to accomplish this as outlined below:

One can put in front of the receiver an absorption filter with a very narrow bandpass, preferably amounting to only a small fraction of an angstrom, at the wavelength of the coherent light.

Two slits, each of the order of a wavelength in width, are set up at the receiver. The appearance of interference fringes as produced by these slits is an indication of the coherence of the radiation. An electrical system using photocells or photomultipliers can be devised to detect the presence of such interference fringes. The slits should be in different portions of the beam and should be at least 100 wavelengths apart.

In the prior art there are numerous methods for imparting information to a light beam. Examples are the high frequency Kerr cell, such as described in Jenkins and White, Fundamentals of Optics (McGraw-Hill 3d ed.) 390, or the diffraction or interference light modulator based on the principle of the Michelson interferometer. Zinc blende is among the materials most suitable for the Kerr cell. A mirror mounted on a piezoelectric crystal at its resonance frequency, or magnetostriction effects in ferrites are ways to modulate the path length in the interference light modulator. Another method for modulating the light beam is an interference filter modulated in thickness by the pressure exerted on it, e.g., by a piezoelectric crystal. These methods, however, have certain disadvantages, such as large light loss (of the order of 50%), a small numerical aperture, and the inability to impress spatial modulation across the wavefront of a light beam incident on the modulator.

For these reasons, light modulators belonging to the class of semiconductor light valves have notable advantages.

The present invention is concerned with a novel method for displaying information whether on a record or by electrical pickup means.

Figures 1, 2, 3, 4, 5, 6, 7, 8:
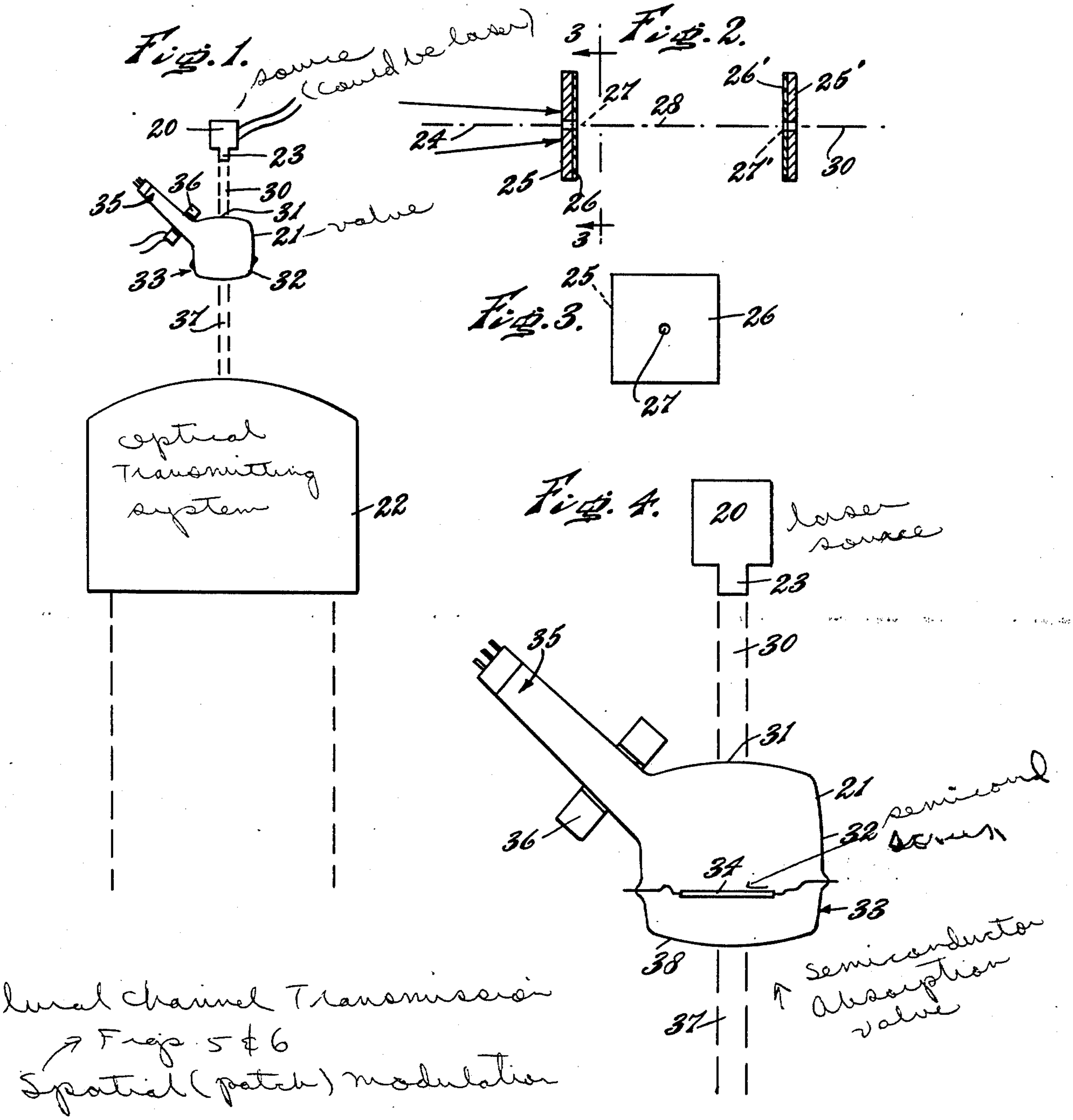
FIGURE 1 is a diagrammatic section of an optical system according to the invention, the section being taken on one optical axis.
FIGURE 2 is a diagrammatic axial section of a Fabry-Perot interferometer which may be used for collimation according to the invention.
FIGURE 3 is a sectional view of the interferometer of FIGURE 2 on the line 3—3.
FIGURE 4 is a diagrammatic section of a light valve according to the invention, the section being taken on one optical axis.
FIGURE 5 is a diagrammatic section of a light valve with filter according to the invention, the section being taken on one optical axis.
FIGURE 6 is an enlarged fragmentary top plan view of the filter screen of FIGURE 5.
FIGURE 7 is a diagrammatic axial section of a Cassegrain enlarger shown in FIGURE 1.
FIGURE 8 is a view similar to FIGURE 7 showing the use of a λ-aperture plate instead of a lens.

As illustrated in FIGURE 1, one form of the system comprises a light source 20, a light valve 21 with the associated electrical equipment for imparting to the light valve input information in the form of electrical signals, and an optical system 22 for transmitting this information to the receiving station. In order to optimize the rate of presenting information to the light beam, the radiation from the light source should be as strictly parallel as obtainable. With a reasonably parallel light beam, the information in the outgoing beam can be made to have a high degree of resolution whether presented as a visual image or impressed on a record, or picked up by a suitable receiver if the information is to be transmitted over a relatively long distance.

A variety of procedures are possible for imparting information to a record, but systems belonging to the classification of electrostatography have notable advantages. For picking up information transmitted over a relatively long distance, of the order of 100 km., photomultiplier tubes have very desirable qualities, such as high sensitivity and fast response time, particularly if the visual pattern is to be converted into electrical signals. For very high rates of information a travelling ray tube with photocathode input is desirable.

Another condition to be imposed on the light beam, in an endeavor to optimize the rate of presenting information on a record, is the requirement of high light flux. In order to transmit 100,000 or more characters per second, the light intensity should lie in the range of 100,000 ft.-lambert or more. This necessitates a very intense light source 20. One such source 20 is the optical maser, such as described by T. H. Maiman (Bull. Am. Phys. Soc. II, 6, W3 (Feb. 4, 1961)).

The optical maser has the further advantage that it emits coherent light. For modes of oscillations in the maser cavity the emitted radiation will be highly parallel. As far as optical systems are concerned, the fact that the radiation emitted from an optical maser can be confined to one or at most to a discrete number of nearly monochromatic chromatic lines reduces the complexity of the problem inherent in chromatic aberrations.

In those cases where the modes of oscillation in the optical cavity favor the emission of the radiation in coherent wavefronts other than nearly plane, an optical correction plate should be interposed between the light source and the modulator to convert the emitted coherent wavefront to a coherent nearly plane wavefront.

A number of different systems for generating coherent light are known in the art. One class uses a crystalline material. This class includes the ruby maser having a ruby 23, the crystalline material being aluminum oxide, $Al_2O_3$, doped with 0.05–0.5% chromium. Other crystalline materials used in optical masers include calcium fluoride, $CaF_2$, doped with 0.05% uranium or 0.05% samarium and barium fluoride $BaF_2$, doped with 0.05% uranium.

Another class of coherent light generators remarkable for their strict monochromaticity though incapable of radiating a light beam of high intensity such as emitted by the ruby maser are the gaseous masers, such as described by A. Javan, W. R. Bennett, Jr., and D. R. Herriott (Physical Review Letters 6, 106 (1961)).

Another class of which only the principle but not the practical realization is known in the art is what shall be called the λ-aperture radiator. This device focuses nearly monochromatic radiation from conventional sources into a small spot, of the order of 0.2 mm. in diameter, overlapping an aperture with the diameter of the order of the wavelength λ of the light focused on it. The diameter of this aperture can be increased by cutting down the angle of divergence of the light beam incident on it. One way of achieving this end is to use a Fabry-Perot interferometer to collimate the light beam as shown in FIGURES 2 and 3.

If the λ-aperture is positioned on the surface of a Luneberg type lens, then the parallel beam is emitted with a maximum angular error less than 2 minutes of arc for beam diameters up to 0.9 of the diameter of the whole sphere. At the present time due to lack of suitable refractive material, such an optical system is restricted to the infrared or microwave region. Conversely, the lens will function well as a microscope objective for infrared radiation up to a numerical aperture close to 1.0.

FIGURES 2 and 3 show an incident light beam 24 passing light through a transparent glass plate 25 at right angles to the axis of the light beam 24, which has on the side remote from the incident beam 24 an approximately totally reflective metallic coating 26 except for a central aperture 27 having a diameter of the order of 0.2 mm., e.g. an aperture with e.g. 5% transmission. The light beam 28 which passes through the aperture 27 then encounters an exactly similar approximately totally reflective metallic coating 26' having a similar central aperture 27' on a similar glass plate 25'. The central aperture 27' should approximate 1 mm. in diameter for the given dimension of 0.2 mm. for 27 and should be 5% transmissive. Of course, these dimensions together with the distance between the reflective coatings 26 and 26' will determine the angular deviation of the emitted light beam 30.

The information may be impressed on the closely parallel light beam 30 emitted from the source by one of several procedures as mentioned earlier, but in accordance with the invention a light valve 21 is utilized with a semiconductor screen 34. Any of the coherent light sources mentioned may be used at 20. Several ways are possible of utilizing a semiconductor screen. In the preferred embodiment, advantage is taken of the variation of opacity or reflectivity of the screen with carrier density.

In order to be capable of being modulated by a light valve of this type, the incident light must have a wavelength longer than the absorption edge of the semiconductor, i.e., the semiconductor must be transparent to the incident light. Thus to modulate light in the infrared from, say 1.5 to 2.5 microns, the semiconductor must have its absorption edge below 1.5 microns. Silicon, with an absorption edge at 1.2 microns, is a suitable semiconductor for modulating near infrared radiation from, say, 1.5 to 2.5 microns. To modulate visible light from 5500 A. to 6500 A., i.e., from the green to the red end of the spectrum, the semiconductor must have an absorption edge at 5000 A. or at a shorter wavelength. Many other semiconductors are known with absorption edges further towards the ultraviolet, such as zinc sulfide, ZnS (3400 A.), cadmium sulfide, CdS (5000 A.), or towards the infrared, such as germanium (2 microns).

To have a semiconductor act as a light valve of this type, the density of carriers in the conduction band of the semiconductor must be increased so that it either absorbs nearly completely the radiation incident on it, say 98%, or reflects it. Of course, before the carriers are raised to the conduction band, the material must be, say, 98% transmissive to the radiation incident on it. Since a slab of 1 mm. thickness is sufficiently thick to support itself mechanically, this condition can be readily realized.

In FIGURE 4, I illustrate a design for a light valve to modulate infrared radiation. In this case an infrared flood beam 30 passes through a transparent window 31 in the back of an envelope 32 of a cathode ray tube 33 and irradiates a silicon sheet 34 transverse to the axis of the radiation. The cathode ray tube 33 has an electron gun 35 generating an electron beam, which is deflected by deflection plates 36. A gun with electrostatic deflection plates may be used instead of one with magnetic deflection coils. The silicon sheet 34 varies in its ability to transmit infrared between a relative minimum, at which it is substantially opaque or reflective, and a relative maximum at which it is substantially transparent, so that depending upon the information which is fed to the cathode ray tube in the form of an electrical signal, certain portions of the silicon sheet will be transmitting and other portions will be opaque. The incident light 30 will be transmitted through the transparent portions of the silicon sheet 34 and through the face plate 38 and will be stopped by the opaque portions of the sheet so that a spatial pattern will be impressed on the outgoing light beam 37.

The cathode ray tube of FIGURE 4 is a known operable device, which will conveniently modulate infrared radiation in the spectral range of 1 to 2 microns. While a transmitting light valve has been illustrated, it will be evident that reflective light valves of similar character, which are also well known in the art, are suitable for the present purpose instead of a transmitting light valve. These simply locate the face plate 31 in the path of the reflected light beam.

The electron beam in the cathode ray tube should be of high energy, e.g. 25 kv. or higher, and there should be a current density of the order of 1 milliampere/mm.$^2$ or even up to 1 ampere/mm.$^2$. The absorption or reflectivity is due to the reservoir of carriers generated in the silicon sheet by the impinging electron beam. The number of carriers is determined by the density and energy of the electrons in the electron beam.

It will be evident, accordingly, that this provides a means for impressing on the record any desired character of information, whether it be alpha-numerical, pictorial, or otherwise.

Besides using an electron beam for generating free carriers in the semiconductor sheet, another means to obtain a similar result is to position the semiconductor sheet preferably outside a vacuum tube in the path of a high light flux of a wavelength shorter than the absorption edge of that semiconductor.

The time interval after the end of the electron bombardment during which the light value retains the information is short, since the lifetime of the carriers is in the range from 0.1 to 10 microseconds. The scanned raster cannot be used conveniently with such a short retention period. Instead, the information must be presented by means of a flood beam of electrons with a configuration which defines the desired character or totality of characters for the period of presentation of that character or totality of characters.

One light valve which is similar in operation to the infrared light valve herein described is disclosed in U.S. Patent 2,527,981. That patent describes an electron beam tube which has the capacity of a light valve to produce an optical image according to the electron impact on a screen. In this case, the dielectric of the composite secondary electron emitter has the optical properties desired for the examination by radiation (suitably infrared) of the pattern produced by the electron bombardment. For this application, the base metal should be in the form of a thin film, partially transparent to radiation, particularly in the infrared.

Information can be imparted to the (infrared) light beam at fantastic speeds at wevelengths longer than the absorption edge of semiconducting epitaxial sheet 34. With an optical maser operating in the continuous mode, this light valve is designed to impart to the light beam one bit, character, or other information arrangement, in less than 100 nanoseconds. The speed may be increased still further for materials with shorter lifetime for the free carriers and suitable absorption edge.

If the semiconductor operates in the mode in which it absorbs the incident radiation, the material and the design of the fixture supporting the semiconducting sheet must be designed to dissipate the energy absorbed to such a degree that the semiconducting sheet can still operate in the desired fashion. For example, if the energy absorbed raises the temperature of the silicon sheet by several hundred degrees centigrade, the free carriers raised into the conduction level by thermal excitation will interfere with the operation of the sheet as an absorber and transmitter of the incident radiation.

If the light flux from the light source fluctuates, then means must be taken to see to it that these fluctuations are not used or regarded as light signals conveying the information pattern. For optical masers using a ruby crystal as the optical cavity, fluctuations with a period of the order of 1 microsecond are observed for operation at room temperature. To make the information to be transmitted meaningful, the light pulses must extend over a period of several of these fluctuations, i.e., the period in which the patches on the semiconductor screen are opaque or transmissive must be greater than the natural period of these fluctuations. If the optical maser works in an intermittent mode, then the modulator must be synchronized with the period of the operational cycle. In many cases the optical maser does not work C.W., i.e., continuously, but emits the radiation in pulses. To modulate and detect information in a coherent light pulse demands special electrical circuitry. This electrical circuitry is not discussed here since the system under consideration is optical.

Since sheets of semiconductor material that may be obtained have an area of at most a few cm.$^2$, the resolution existing in a monochromatic light pattern cannot be retained for any considerable distance of transmission because of the overlapping of the different patches into which the cross section of the light beam is resolved. Recourse must be had to an optical system designed to retain this spatial information and minimize overlapping. If the light beam is used for printing in a system classified as electrostatography, such as xerography or the thermoplastic tape (see application Ser. No. 81,649, filed Jan. 9, 1961, by Arthur Bramley) or on a photographic film, this requirement is not severe. However, even here, in order to utilize the full area of the semiconductor sheet, it may be necessary to enlarge the cross section of the light beam emitted by the source to enclose the full area of the semiconductor sheet while still maintaining the light beam closely parallel as it emerges from the semiconductor sheet in the region where that sheet is transparent.

For long range transmission, such as needed in light signalling, use of a coherent light beam makes the problem simpler. One means of achieving parallel channel long range transmission is illustrated in FIGURES 5 and 6, which show a semiconductor sheet divided into opaque and transparent sections. The light emerging from each of the transparent sections can be regarded as a light channel in parallel with the other light beams emerging from the semiconductor sheet. Thus I have what can be regarded as a number of channels for transmission of information in parallel. The information is impressed on the light beam by changing the transmission of the sections from good (about 98%) to opaque (about 1%) transmission.

The system for the light valve described in the preceding sections operates on inducing in a semiconductor a condition resembling metallic reflection. This condition is achieved by pumping into the conduction band an excess concentration of free electrons by bombardment of the semiconductor wafer by a multielectrode gun 35′ controlled by an electrostatic deflection assembly 36′. Thus a shutter arrangement is brought about, which allows certain patches on the wafer surface to be transparent while others are opaque. To utilize this spatial arrangement of information in the light beam, it may be necessary to enlarge the area of the projected light beam.

This requirement may not arise in the chromatic light valve. The various patches on the multiple layer wafer can be conditioned to transmit radiation of different wavelengths to the receiver by utilizing suitable transmission filters. The information transmitted from the various patches being of different wavelength distribution can be differentiated from each other even if radiations from adjacent patches overlap.

One obvious way of conditioning the patches to transmit radiation of different wavelength distribution is to place a narrow-band light filter in the path of the light being transmitted from each patch, each filter transmitting different wavelength distribution. In this mode of operation, the patch is made to be opaque or transparent as before.

To achieve wavelength selection of the information, a set of filters 40 is shown in FIGURE 5 immediately following the semiconductor sheet 34 in the light beam 30 incident on the transparent face plate 31. The light transmitted by the filter, each section being capable of transmitting a different wavelength distribution, emerges as the light beam 37 from the exit face plate 38. The arrangement of semiconductor 34 and wavelength selector filter 40 is supported by the mounting pins 44 shown sealed into the glass wall of the tube envelope.

In FIGURE 6 is shown a suitable array of transmission filters, each transmitting a different wavelength distribution. In this illustration, nine filters are shown as making up the filter assembly 40.

One of the problems that must be considered with regard to the light valve, is the dissipation of the large amount of heat that will be generated when the light valve is used for a printing process. To keep the temperature rise of the semiconductor sheet, e.g., silicon, within safe limits, i.e., below 100° C., the following restrictions must be imposed on the light valve structure:

In the application to printing, the scan is restricted to a single line while the thermoplastic tape on which the print is impressed moves in the path of the infrared radiation modulated by the semiconductor sheet, here reduced to the size of a thin slab. The infrared radiation to be modulated is focused on the lateral area of the slab which has the form of a narrow strip, the width of a single scan line. This semiconductor slab is contained on both sides by a good thermal conductor, such as aluminum bars.

For other applications this severe restriction can be somewhat reduced. Still adequate care must be taken to dissipate the heat absorbed by the semiconductor to prevent undue temperature rise.

It is possible, of course, to use the light valve to modulate the beam as a unit, i.e., to utilize one channel only.

There are, of course, other possible means for time-sequential modulation of the intensity of the light beam of a particular wavelength. If the light beam 30 from the optical maser, as shown, e.g., in FIGURE 5, is composed of a number of discrete wavelengths, then instead of the cathode ray tube type modulators 33, a set of light modulator units, e.g., Kerr cells may be used in an array in the path of the light beam itself. Each of these must be provided with a suitably chosen narrow band filter to select the light of a particular wavelength.

The optical system acting on the radiation emitted by the optical maser should be designed so as to retain the coherent wavefront in a configuration, which allows the parallelism in the beam to remain optimized.

In the arrangement of the optical system for transmitting information illustrated in FIGURE 5, it is preferable to have as the light source an optical maser operating in a mode to emit a coherent wavefront and to design the light modulator, e.g., the light valve, and its associated optics so that the light beam emerging from the light valve possesses a nearly plane coherent wavefront. The light propagated from a plane coherent radiator is parallel to within an angle $\alpha=\lambda/\sqrt{A}$ (in radians) where $\lambda$ is the wavelength of the light and A the area of the radiator. This relation is quite well known in antenna design. The magnitudes of the quantities involved are apparent from the following example: $\lambda=1$ micron, $A=1$ cm.$^2$, $\alpha=10^{-4}$ radians (0.3 minute of arc).

Although the theoretical limit has not yet been reached, in the example that follows use is made of this calculated value for the angle of divergence. Of course, for any practical set-up utilizing an optical maser, the measured angle of divergence must be used instead. At the present time the practical value is about 3 times the theoretical limit.

If the information is to be impressed on a record which is only a few centimeters away from the light valve, the resolution of the pattern impressed on the light beam by the light valve will not be impaired when the divergence $\alpha$ is so small. However, when the information is to be transmitted over a relatively long distance, say 1 km., then a circular light patch 1 cm.$^2$ in the area at the light valve will spread to an area of nearly 100 cm.$^2$, so that patches 1 cm.$^2$ in area lying side by side at the light valve would completely overlap each other 1 km. away from it.

The Cassegrain system 22 illustrated in FIGURE 7 together with the associated correction means, whether of the Ross, Schmidt, Maksutov, or other type, is one possible design of an optical system which permits the information pattern to be retained in the system instead of being washed out by overlapping. Other optical systems utilizing the same principles will be apparent to anyone skilled in the art.

It is possible, of course, to modulate the light beam after it has passed the optical system either as a unit or, for multichannel transmission, in different areas of the cross section. The optical system through which the light beam has passed may, e.g., be of the Cassegrain type such as shown in FIGURE 27.

In FIGURE 7, the light beam 37 of small diameter incident on the optical system is shown to be approximately parallel, such as a beam generated by the ruby maser. This incident approximately parallel beam is transformed by the optical system into another approximately parallel beam 45 but of smaller divergence angle than the initial beam, i.e., with a higher degree of parallelism.

The incident beam 37 passes through a central opening 46 of a concave mirror 47 and then through a diverging lens 48 to a convex mirror 50, which reflects light to the concave mirror 47 to form the emerging beam 45.

It will be evident that the incident beam 37 to the optical system 22 will desirably pass through a regional selector such as a light valve or a filter which passes different wavelengths in different areas.

In FIGURE 8 a variation of the system is shown in which the coherent light beam is generated by a $\lambda$-aperture radiator. This is achieved by replacing the divergent lens in FIGURE 7 by the $\lambda$-aperture plate 51. The incident light beam, with a small angle of convergence, is then focused on this plate into a spot of the order of 0.001″ in diameter encompassing the $\lambda$-aperture. Of course with the arrangement shown in FIGURE 8 only time-sequential modulation of the light beam is possible, which is achieved by time-sequential modulation of the incident convergent light beam. In the arrangement of FIGURE 7, both time-sequential and spatial modulation can be achieved by passing the nearly parallel incident light beam from the optical maser through a light valve, such as shown in the arrangement of FIGURE 4.

A reflective optical system illustrated in FIGURE 7 has been chosen as a possible means to achieve transmission of information spatially distributed among several optical channels in parallel, but a refractive system could have been employed equally well to accomplish this purpose. However, the reflective system has certain advantages, such as minimizing absorption of energy from the light ray. If the optical system be restricted for use with a highly monochromatic radiation of a specified wavelength, then the added correction means might be dispensed with if the design of the mirrors insures the flatness of the field.

The function of the Cassegrain optical system 22 is to increase the area of the nearly plane coherent wavefront emerging from the light modulator (1 cm.$^2$ in the preceding example) to a size sufficiently large to reduce the size of the beam cross section at 1 km. as compared to the area of 100 cm.$^2$ it had in the preceding example while keeping the wavefront nearly plane and coherent. This reduction in size of the beam cross section at the receiver, accomplished by reducing the angle of divergence through an increase in the area of the radiator, is quite analogous to the much higher directivity obtained in radio transmitters with large antenna. The diameter of the mirror system must obviously be chosen to allow this functional operation to be achieved.

If there is more than one patch, say three patches, each 1 cm.$^2$ in area lying side by side, the enlargement of the nearly plane coherent wavefront must be chosen so that these patches do not completely overlap at the receiver (1 km. away in this example). If the optical system blows up the area of each circular patch from 1 cm.$^2$ to 16 cm.$^2$, as illustrated in FIGURE 9, this is sufficient to insure that the patches at the receiver (1 km. away), each less than 40 cm.$^2$ in area, will not overlap completely but will be in a configuration as shown in FIGURE 9, which represents the cross section of the beam at the receiver. The nonoverlapping portions 52 of the patches are indicated with single vertical lines. The overlapping portions 53 are cross-hatched.

The exact shapes of the reflective surface in the Cassegrain optical system 22, both the pierced primary concave mirror 47 and the secondary convex mirror 50 are determined by the condition that the optical paths of all light rays starting at a given time instant from a nearly plane coherent wavefront incident upon the system must be such that at a subsequent instant of time they all terminate at a nearly plane coherent wavefront emerging from the system.

In a reflective system designed to retain a coherent wavefront in simple geometrical form, such as the plane mentioned in the preceding paragraph, within a deviation of one wavelength per centimeter, the angle of incidence of the light beam in any of the reflective surfaces should be less than 10° from the normal. This requirement is a consequence of the fact that the change of phase on reflection varies rapidly if the angle of incidence is greater than 10° from the normal.

The same design objectives must be adhered to in designing a refractive system. In certain special cases the coherent wavefront incident upon the optical system may be not plane but may conform to some other simple geometrical surface. A suitable design for a shortfocus refractive system is illustrated in FIGURE 10. The light passes first through diverging lens 54 and then through converging lens 55. If the incident coherent nearly parallel light beam 37 has a medium size diameter, say 1 cm., then the divergent lens 54 can be dispensed with, in which case the nearly parallel coherent light beam 37 is incident directly on the convergent lens 55. In special cases, the coherent wavefront incident upon the optical system may not be plane but spherical. In such cases it may be advantageous to use a refractive rather than a reflective optical system to achieve adequate separation of the individual patches at the receiver. In the special case where the interest lies not in transmitting information over a large distance but is directed towards a short-range focused image, the emerging coherent wavefront to be achieved will be not a plane but a nearly spherical surface at 56.

Figures 11, 12, 13:
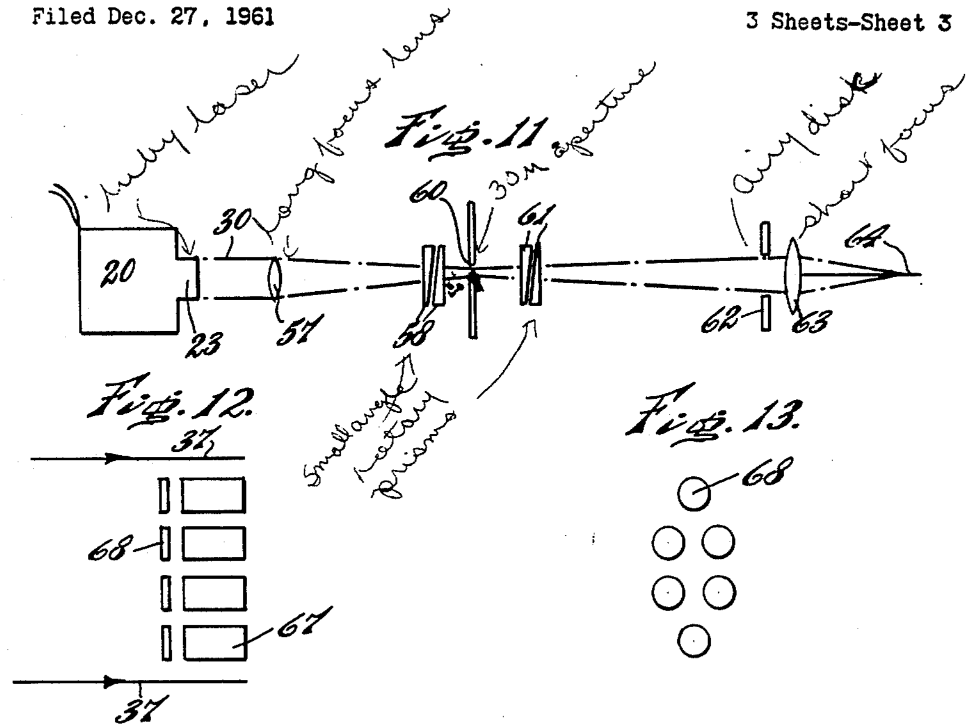
FIGURE 11 is a diagrammatic axial section of an optical system according to the invention for obtaining a high photon density where the source of light has some imperfection so that it departs slightly from coherence.
FIGURE 12 is a diagrammatic side elevation of a receiver for the spatially modulated light beam of the invention.
FIGURE 13 is a diagrammatic view of the receiver of FIGURE 12, looking from the transmitter.

In an endeavor to achieve as high a photon density as possible at the exit focal spot of the optical system, it may be preferable to use a system such as shown in FIGURE 11. This system is designed to insure the coherence of the light beam at the exit focus spot in cases where imperfection in the light source or other reasons cause the light beam entering the system to depart from the optimum state of coherence. The optimum degree of coherence at the 30$\mu$ aperture 60 may be achieved in particular if the divergence angle $\delta$ of the light beam leaving the long focus lens 57 satisfies the following formula: $\delta$ (radians)$=2\lambda/\pi d$, where $d$ is the diameter of the aperture (indicated as 30$\mu$ in FIGURE 12) upon which the light beam is incident. (The formula is derived from known calculations cited, e.g., by L. Mandel, Journal of the Optical Society 51, 797 (July 1961).)

FIGURE 11 shows an optical maser 20 having for example a ruby crystal 23 which produces a beam of light 30 which in this case is approximately monochromatic but has a small divergence. The beam 30 is passed through a long focus lens 57 and then through two small-angle rotary prisms 58 and then through an aperture 60 of approximately 30$\mu$ diameter. The beam then passes through two small-angle rotary prisms 61 and then through a stop 62 which has a diameter such as to restrict the light beam to the area of the central Airy disc image. The light then passes through lens 63 which may for example be a 90X aplanatic objective of N.A.=0.95. Focus is accomplished on spot 64 which suitably will have a diameter of about 1$\mu$.

The optical system is corrected for spherical aberration and is coma-aplanatic.

Between the long focus lens 57 and the 30$\mu$ aperture 60, the divergence angle of the light beam is chosen to maximize the coherent light output from the aperture.

The symbol $\mu$ is used in its conventional meaning as an abbreviation for micron.

The two sets of small rotating prisms shown in FIGURE 11 are included in the optical set-up to permit positioning the spot from the long focus lens on the 30$\mu$ aperture and also to position the spot of the short focus aplanatic objective in a selected area.

When information is imparted to the light beam in the form of amplitude modulation, care should be exercised to avoid haivng phase modulation in addition to it since that may increase the divergence of the light beam. It is, however, possible in principle to impart information to the light beam not only by amplitude modulation but also by frequency modulation or phase modulation.

A method of frequency modulation is based on the fact that the frequency of the spectral line emitted by the coherent light generator can be shifted by subjecting the emitter substance, such as the ruby crystal or the neon gas, to a strong electric or magnetic field, which displaces the energy levels of the substance. A modulation of this field can result in frequency modulation of the light beam.

As pointed out below in the discussion pertaining to the receiver, phase modulation must be in the kilomegacycle range.

The high density D of photons that occurs in high intensity light beams coupled with the high value of the electric field that is a direct consequence of it if the radiation in the wavefront is coherent, may require suitable alteration of the classical theory of dispersion to meet those conditions.

In the classical theory of dispersion, it is convenient to consider separately the contributions from bound and from free electrons. If only the former contribute, the material is a nonconducting dielectric, whereas if the latter predominate, it is a metal. Both contributions are important for a semiconductor. Bound electrons give rise to the intense absorption on the shortwave side of the main absorption edge, while free carrier absorption becomes significant at longer wavelengths. With the high electric field likely to be encountered in coherent radiation, the band structure will be drastically perturbed by the Stark and Zeeman effects to induce a high intensity dipole moment.

In a medium with nonvanishing conductivity, the refractive index is complex and may be expressed as $$N=m+ik$$

where $c/n$ is the velocity of propagation in the medium and $k$ the absorption or attenuation index, is related to the absorption coefficient K by the expression $K=4\pi n/\lambda$, $\lambda$ being the wavelength of the incident radiation, and $c$ being the velocity of light in vacuo.

The result of these alterations is that $n$ can no longer be considered solely a function of $\lambda$ and of parameters of the medium, such as the temperature T, but must include the photon density D. The same conclusions are pertinent to the absorption coefficient K.

In order to obtain optimum performance from a refractive component, the features of the crystal structure that enter into the electromagnetic wave propagation need careful selection. Materials need to be selected such that the superposition of coherent polarized components of the electromagnetic wavefront leads to a polarized component. With the high electric fields likely to be encountered, this requires that the splitting of the band levels arises predominantly from a first order Stark effect.

Besides this requirement, the absorption coefficient K should be low to minimize phase distortion. It should be related to the wavelength $\lambda$ of the radiation incident on the refractive system by the expression $K\lambda<<10^{-4}$. Also $\lambda$ should be such that $hc/\lambda$ be less than the bandgap energy for the insulator that makes up the lens system, where $h$ is Planck's constant and $c$ is the velocity of light in vacuo. This is a further requirement necessary to minimize absorption and to eliminate the free carriers and the absorption associated with them.

For a refractive system, these conditions may be not too drastic, particularly if the concentration of carriers in the conduction band can be maintained at less than $10^{14}/cm.^3$. In this case a suitable material for infrared radiation is KCl. When this limit on the concentration of carriers is exceeded, higher order effects can arise, such as the quadratic Stark effect. Such effects can also arise when the density D of photons in the light beam incident on the refractive material is high, of the order of $10^{12}$ photons/cm.$^3$.

The index of refraction $n$ will have the form $n=n(\lambda, T, D_\lambda)$, where $\lambda$ is the wavelength, T is the temperature and $D_\lambda$ is the energy density. Besides this functional dependence of the index of refraction on photon density, other interaction effects may arise if radiation of wavelength $\lambda'$ is incident on the refractive material simultaneously with radiation of wavelength $\lambda$. The index of refraction then has the form $n=n(\lambda, T, D_\lambda, \lambda', D_\lambda')$.

As mentioned earlier, when $\lambda'$ is shorter and $\lambda$ longer than the absorption band edge, the light valve can be made effective if the coupling (i.e., interaction) term in the index of refraction is significant.

Relaxation processes also play a role in these phenomena. The irradiation of the semiconductor screen by light of wavelength $\lambda$ may occur subsequently to irradiation with the wavelength $\lambda'$ by many microseconds, yet the coupling interaction noted in the expression for the refractive index can still be dominant. A light beam of wavelength $\lambda'$ shorter than the absorption edge of the semiconductor may scan the semiconductor using any well known optical scanning system instead of the electron gun and control coils utilized in the electronic method of production of excess free carriers in the conduction band of the semiconductor.

As I have noted, the free carrier concentration in the semiconductor light valve may be made so high that the areas in which this occurs act as good reflectors. Thus, as I already mentioned, a semiconductor light valve can act not only as a modulated transmission device but also as a modulated reflection device. If a modulated reflective device is placed at the receiver, then the light incident on the receiver can be reflected back with a new set of information impressed upon it by the reflective modulator, to the original transmitter station or some other location depending on the optical system at the receiver and on the relative intensities at these positions. This means that under certain conditions, such as compatibility of frequency ranges for the information, the receiver can retransmit information without having at that location a coherent generator, such as an optical maser.

These operations are especially pertinent to the functioning of the semiconductor screen as a light valve. The inversion of population, which results from the transfer of carriers from the valence band to the conduction band of the semiconductor, leads to the same type of expression for the velocity of propagation ($c/n$) or the absorption coefficient K, as the coupling cited above. However, in many instances it is more convenient in the light valve to cause this transfer of carriers not by light with a shorter wavelength than the absorption edge but by electron bombardment.

In the case where the refractive system is used to focus the radiation from an optical maser to very fine dimensions, of the order of the wavelength of the radiation, these drastic modifications of the index of refraction may require that the condensing action of the refractive system occur in a vacuum enclosure. Such a focused spot of light might be used for fusing materials in vacuum or in an appropriate gas atmosphere or for obtaining temperatures and fields leading to atomic stripping and nuclear reactions.

The focusing of the extremely intense light beam into a spot of wavelength dimensions brings into sharp conflict quantum theory and the theory of the electromagnetic field. The energy associated with one photon in the visible region of the spectrum is quite low. According to the quantum theory, it is the quantum which plays an important role rather than the extremely high energy density $D_\lambda$, which is expected to play a part according to the electromagnetic theory.

If the coherent radiation is focused into a small area of the order of the wavelength of the light, then for a high powered source the density of photons in the focused area may approach the density of electrons in a semiconductor. With such a density of correlated photons, an atom or atomic system may absorb promptly energy equivalent to that of the sum of many photons. Thus the photon density at the focus of the objective lens is concentrated to such a degree that the probability of multiple photon absorption by a single atomic system is comparable to the probability of single photon absorption. Radiation emitted by an atom or atomic system in this state may have a wavelength much shorter than that of the incident light. The detection of radiation of this wavelength by a photomultiplier in conjunction with a filter which only transmits wavelengths shorter than that of the incident radiation would constitute a positive means of detecting and identifying coherent radiation.

With such a high density photon field, a frequency multiplier system can be made for optical radiation. An atomic system in which the energy of the electron levels is related harmonically would be preferable for such a device. Systems with these characteristics for the difference between the electron energy levels might be generated by applying a magnetic or electric field (or a combination of both) so as to obtain Zeeman or Stark (or combined) displacements of the levels.

To minimize absorption, it is preferable for the light to go through impurity-free material. Thus air should be dust-free and the refractive material should not have impurities or lack of homogeneity in structure causing absorption or scattering. For very high photon density in the beam, it is preferable to utilize the optical system in a vacuum. The possible need for a vacuum was indicated before in conjunction with possible drastic modifiications of the index of refraction of a medium under the action of a light beam with extremely high photon density.

A photomultiplier has been suggested as a suitable receiver for picking up unformation transmitted over a relatively long distance. In view of the highly monochromatic radiation emitted by an optical maser, the noise (spurious signal) can be greatly reduced if a filter is used to select the light impinging on the photodetector. Interference filters with a few angstroms bandwidths are obtainable and can be designed to give maximum transmission at the wavelength of the incident coherent light. In many cases it is possible to improve the receiver further so that it is selectively a receiver for coherent radiation.

Figure 14:
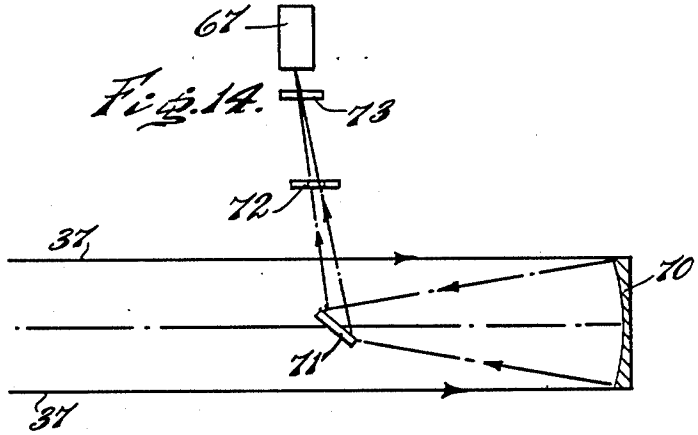
FIGURE 14 is a diagrammatic section of an alternate form of receiver, the section being taken on one optical axis.

If a light beam 37 at the receiver is composed of a number of separate light bundles, each time-sequentially modulated, so that the totality of the bundles produces a time-sequentially modulated spatial pattern, then an array of photomultipliers 67 together with their associated light filters 68 must be used, one for each separate bundle in the beam. Such an array is shown in FIGURES 12 and 13. If the light beam is transmitted over a great distance, then due to the divergence, even though very slight, present in the almost parallel beam, the light intensity at the receiver will be relatively low. In this case an optical system, such as shown in FIGURE 14, should be used to enhance the intensity of the light incident on the photodetector, shown in the figure as a photomultiplier 67. Of course, refracting optical systems are equally applicable.

The light beam 37 strikes the concave paraboloidal mirror 70 and is reflected onto the angularly disposed plane mirror 71, which sends it through the aperture plate 72 and the interference filter 73 to the photomultiplier 67.

The aperture in the aperture plate 72 is shown in FIGURE 14 merely to indicate that the photodetector may be in a light-tight box, except for the aperture on which the light is incident. This system is not essentially different from astronomical systems used to detect weak light beams. If the incident light beam on the receiver is composed of a number of different bundles acting as separate channels in parallel, then the light beam from the optical receiver will be focused not on a photomultiplier, but, e.g., on an image orthicon, which will allow the time-sequential aspect of the spatial pattern to be translated into electrical signals. Of course, if the speed of modulation of each channel is very high, in the upper megacycle region, then again I must have a high speed tube to transduce the optical signals into electrical signals, one for each of the individual bundles, i.e., separate channels in parallel, constituting the light beam. Such a device can be a photocathode in a travelling wave structure.

Certain types of optical masers emit not one approximately monochromatic line but a number of them. This allows information to be impressed separately on each of the individual wavelengths. In this case one would in general not attempt to transmit a spatial pattern but would use the different spectral lines in the one light beam to achieve a multiplicity of separate channels in parallel, each modulated time-sequentially. This can be accomplished by an arrangement similar to the one shown in FIGURE 4, but here the different sections of the semiconductor, e.g., silicon, sheet will be followed directly by a light filter transmitting only one of the wavelengths. This arrangement is shown in FIGURES 5 and 6. If the speed of imparting information at different wavelengths is extremely high, a multigun tube may be required. If required, the beam can again be transmitted by a Cassegrain type optical system, such as shown in FIGURE 7. The advantage here of using such an optical system is to decrease the angle of divergence of the transmitted light beam and so to improve the intensity of the radiation at the ultimate receiver. In the arrangement, in which the information is transmitted by individual light bundles operating as separate channels in parallel, the optical system is used further to retain the identity of the (geometrically) nearly parallel light bundles so that overlapping is reduced to a minimum.

In this case where the coherent generator emits a number of nearly monochromatic lines, one shall again have at the receiver an arrangement similar to that shown in FIGURES 12 and 13, but each of the light filters, one in front of each photomultiplier, will now transmit only radiation of one of the lines emitted by the coherent generator.

Again if the light intensity at the receiver is low, an optional system similar to that shown in FIGURE 14 can be used to enhance the light intensity, but the interference filter and photomultiplier following the aperture plate 72 will be replaced by an arrangement such as shown in FIG. 14P in Jenkins and White, Fundamentals of Optics (3d ed.). The multichannel beam (each channel corresponding to a different wavelength but not separable geometrically from the ensemble as in the case of a multiplicity of geometrically nearly parallel bundles) is incident on an entrance slit MN. This slit MN functions similarly to the slit 72 of FIGURE 14. Instead of having the screen AB continuous as shown by Jenkins and White, it will be provided with a series of exit slits, each of which will receive only one of the images of the entrance slit at a particular wavelength. These diverse images are shown in FIGURE 14R as shown in Jenkins and White. The detection will be carried out by a suitable device, such as a photomultiplier, to pick up the light signal transmitted through each exit slit. A separate photomultiplier will be required for each such exit slit.

If different parts of the light beam collected by the receiver used to enhance the intensity are phase modulated at a high rate of modulation, then the light intensity incident on the exit slits may also be modulated, i.e., phase modulation at the input of the receiver may manifest itself as amplitude modulation. To have this occur, the rate of phase modulation must be extremely high. For example, if the Fabry-Perot plates $E_1$ and $E_2$ (in the previously mentioned FIG. 14P from Jenkins and White) are separated by 3 cm., then the light output at the exit slits will be appreciably affected only provided the phase modulation is in the 10 kmc. range.

Of course, if such high resolution is not required, the pair of Fabry-Perot plates can be dispensed with. The line spectrum formed after the light from the slit MN passes through the prism P is focused on the screen AB, the detectors being positioned at the exit slits in the screen AB corresponding to the positions of the spectrum lines.

In view of my invention and disclosure, variations and modifications to meet individual whim or particular need will doubtless become evident to others skilled in the art, to obtain all or part of the benefits of my invention without copying the structure and method shown, and I, therefore, claim all such insofar as they fall within the reasonable spirit and scope of my claims.

Having thus described my invention what I claim as new and desire to because by Letters Patent is:

1. A light valve comprising a cathode ray tube having an electron gun producing an electron beam of energy of at least 25 kilovolts and a current density of at least 1 milliampere/mm.$^2$, a semiconductor screen in the path of the scanning electron beam, the electron beam generating in the screen an increased density of carriers in the conduction band, which change the optical properties of said screen within less than 100 nanoseconds, and spatially modulating the optical properties of the screen, means for introducing light into the tube to impinge upon the screen and be time-sequentially and spatially modulated thereby, and means for allowing the time-sequentially and spatially modulated light to emerge from the tube.

2. A light valve of claim 1, in which the light is transmitted through the screen.

3. A light valve of claim 1, in which the light is coherent light, in combination with means for maintaining the light substantially coherent as it passes through the light valve.

4. A light valve of claim 1, in which the means for introducing light comprises means for passing a substantially parallel beam of coherent light through the screen.

5. A light valve of claim 1, in which the spatially modulated light conveys information, in combination with means for receiving the information conveyed by the spatially modulated coherent light beam thus produced.

6. A light valve of claim 5, in combination with means for enlarging the cross section of said beam of coherent light while retaining coherence before the light beam is received, thus minimizing the loss in intensity.

7. A light valve of claim 6, in which said means for enlarging the cross section of said beam of coherent light comprises a reflective system having reflective surfaces and having an angle of incidence of the light beam on the reflective surfaces less than 10° from the normal.

8. A light valve of claim 6, in combination with a narrow-band interference filter along the path of the light beam ahead of the means for receiving the information.

References Cited by the Examiner

UNITED STATES PATENTS

| | | | |
|---|---|---|---|
| 1,615,735 | 1/1927 | Benford | 88—24 |
| 2,186,123 | 1/1940 | Rantsch et al. | 88—24 |
| 2,290,581 | 7/1942 | Donal | 178—7.5 |
| 2,330,171 | 9/1943 | Rosenthal (BRAMLEY) | 313—91 |
| 2,432,908 | 12/1947 | Levereng | 313—91 |
| 2,517,263 | 7/1950 | Raibourn | 250—199 |
| 2,577,756 | 12/1951 | Harrington | 178—5.4 |
| 2,585,846 | 2/1952 | Rosenthal (BRAMLEY) | 178—7.5 |
| 2,692,950 | 10/1954 | Wallace | 88—611 |
| 2,692,952 | 10/1954 | Briggs | 88—611 |
| 2,713,116 | 7/1955 | Raibourn | 250—7 |
| 2,928,056 | 3/1960 | Lampert | 332—54 |
| 2,929,922 | 3/1960 | Schawlow et al. | 250—199 |
| 2,929,923 | 3/1960 | Lehovec | 250—199 |
| 2,964,619 | 12/1960 | Hahn et al. | 250—7 |
| 3,040,127 | 6/1962 | Lavin | 178—7.5 |
| 3,078,338 | 2/1963 | Glenn | 88—61 |

OTHER REFERENCES

Publication I: "Electronic Design," Mar. 15, 1961; page 34 relied on.

Publication II: "Photoelectric Mixing As A Spectroscopic Tool," T. A. Forrester, in the "Journal of the Optical Society of America," March 1961; page 258 relied on.

DAVID G. REDINBAUGH, *Primary Examiner.*

ROY LAKE, *Examiner.*